(12) United States Patent
Cassity (10) Patent No.: US 10,888,086 B2
(45) Date of Patent: Jan. 12, 2021

(54) HUNTING BLIND

(71) Applicant: Tony Cassity, Benton, KS (US)

(72) Inventor: Tony Cassity, Benton, KS (US)

( * ) Notice: Subject to any disclaimer, the term of this patent is extended or adjusted under 35 U.S.C. 154(b) by 0 days.

(21) Appl. No.: 16/576,545

(22) Filed: Sep. 19, 2019

(65) Prior Publication Data

US 2020/0008419 A1    Jan. 9, 2020

(51) Int. Cl.
*A01M 31/02* (2006.01)
*E04H 15/00* (2006.01)
*E04H 15/58* (2006.01)

(52) U.S. Cl.
CPC ......... *A01M 31/025* (2013.01); *E04H 15/001* (2013.01); *E04H 15/008* (2013.01); *E04H 15/58* (2013.01)

(58) Field of Classification Search
CPC ........................... A01M 31/025; E04H 15/001
See application file for complete search history.

(56) References Cited

U.S. PATENT DOCUMENTS

| | | | |
|---|---|---|---|
| 586,145 A * | 7/1897 | Sievers, Jr. ........... | A01M 31/06 43/2 |
| 2,237,897 A * | 4/1941 | Vos ......................... | A63H 3/08 446/388 |
| 3,052,054 A * | 9/1962 | Littleton ............................. | 43/1 |
| 3,163,418 A * | 12/1964 | Myers ..................... | F41J 3/0004 273/408 |
| 3,936,969 A | 2/1976 | Richard | |
| 4,788,997 A | 12/1988 | Clopton | |
| 4,829,694 A | 5/1989 | Oasheim | |
| 5,075,999 A | 12/1991 | Fredericks | |
| 5,675,926 A | 10/1997 | Manka | |
| 5,943,807 A * | 8/1999 | McPherson ........... | A01M 31/06 43/2 |
| 6,202,665 B1 | 3/2001 | O'Hare | |
| 6,296,005 B1 | 10/2001 | Williams et al. | |
| 6,415,807 B1 | 7/2002 | Maher | |
| 6,431,192 B2 | 8/2002 | O'Hare | |
| 6,553,708 B1 | 4/2003 | Wolfe | |
| 6,925,745 B1 | 8/2005 | Alessi | |
| 7,311,355 B2 | 12/2007 | Fargason, III | |
| 7,575,241 B1 | 8/2009 | Keller | |
| 7,658,140 B2 | 2/2010 | Lombardi | |
| D637,738 S | 5/2011 | Reddick et al. | |
| 7,997,291 B2 | 8/2011 | Gressette, III et al. | |

(Continued)

OTHER PUBLICATIONS https://huntemup.com. Real-Geese Confidence Cow Blind/Decoy https://huntemup.com/product/real-geese-confidence-cow-blind-decoy/#description (Continued)

*Primary Examiner* — Noah Chandler Hawk
(74) *Attorney, Agent, or Firm* — Kenneth H. Jack; Davis & Jack, L.L.C.

(57) ABSTRACT

A hunting blind incorporating a right panel having a cow silhouetting periphery; a left panel having a cow silhouetting periphery; and a matrix of cross members spanning between the panels; wherein one of the matrix members pivots for seating; wherein another of the matrix members is adapted to pivot in the manner of a door and has a cow rear silhouetting periphery; and wherein another of the matrix members pivots to form a storage shelf; the hunting blind further incorporating a cow head silhouetting plate suspended from the panels' forward ends.

10 Claims, 7 Drawing Sheets

(56) References Cited

U.S. PATENT DOCUMENTS

| | | |
|---|---|---|
| 8,701,332 B1 | 4/2014 | Chavez |
| 9,010,013 B2 | 4/2015 | Smith |
| 9,033,021 B2 | 5/2015 | Hand |
| 9,961,893 B1 | 5/2018 | Schumacher et al. |
| 2007/0119490 A1 | 5/2007 | Reddick et al. |
| 2008/0263929 A1 | 10/2008 | Fiore et al. |

OTHER PUBLICATIONS

Sportsman's Guide. GhostBlind 4 Panel Predator Blind with Free Extender Set. https://www.sportmansguide.com/product/index/ghostblind-4-panel-predator-blind-with-free-extender-set?.
Sportsman's Guide. Montana Decoy Buck and Doe Decoy https://www.sportsmansguide.com/product/index/nnontana-decoy-buck-and-doe-decoy?a=725843.

* cited by examiner

HUNTING BLIND

FIELD OF THE INVENTION

This invention relates to hunting blinds. More particularly, this invention relates to such hunting blinds which are adapted for sculpturally portraying objects which are naturally found within deer habitats.

BACKGROUND OF THE INVENTION

Deer, game birds, and water fowl are known to cautiously examine an open field space prior to entering the field. In circumstances where an animal views an animal which may be a predator, or views a foreign object such as a conventional hunting blind within an open field space, the animal's natural caution often will cause it to opt against entering the space. However, deer, game birds, and water fowl are known to feed and browse within fields which are occupied by cattle.

The instant inventive hunting blind takes advantage of and utilizes a game animal's willingness to occupy field spaces with cattle by specially configuring a hunting blind for silhouetting a cow, for convenient use as a hunting blind, and for convenient carriage in a collapsed configuration.

BRIEF SUMMARY OF THE INVENTION

The term "cow" utilized below is intended to refer to all types of cattle including bulls, heifers, steers, and oxen.

A first structural component of the instant inventive hunting blind comprises a right panel having a head end, a rear end, and a cow body silhouetting periphery. In a suitable embodiment, the right panel is composed of plywood having a thickness between ¼" and ½". Also suitably, the panel may comprise a lamination of paper or plastic sheets, including one or more pleated or corrugated sheets. In the preferred embodiment, the right panel is sized consistently with the profile of a common cow.

A further structural component of the instant inventive hunting blind comprises a left panel which preferably laterally mirrors and reproduces the right panel component.

A further structural component of the instant inventive hunting blind comprises a matrix of cross members which spans between the left and right panels, and which vertically supports the panels parallel to each other. A hunter shrouding or screening space is thereby defined between the panels.

In use of the instant inventive hunting blind, a hunter may position himself or herself between the left and right panels, while the matrix of cross members holds such panels in their vertical positions. In a preferred mode of use of the instant invention, the panels and cross member matrix is assembled in a rural field where deer or other game animals are known to frequent. While the hunter remains between the panels, game animals entering the field recognize the erected panels as a cow instead of perceiving any foreign object which might scare the animal to flight. Upon entry of the game animal into the field, the hunter may fire his or her hunting rifle or shotgun from the hunting blind. Suitably, the blind may be used for bow hunting or crossbow hunting.

In a preferred embodiment of the instant inventive hunting blind, at least one of the cross members among the matrix of panel supporting cross members comprises a pivoting seat. In the preferred embodiment, the pivoting seat is positioned toward the rear of the hunting blind, assuring that hunter utilizing the hunting blind situates his or her body toward the rear of the silhouetted cow.

In a further preferred embodiment of the instant inventive hunting blind, another one of the cross members comprises a pivoting or swinging rear door, such door preferably silhouetting the rear of a cow. Further panel supporting cross members may be configured for functionally serving as a storage shelf while dually functioning for vertical support of the left and right panels.

Accordingly, objects of the instant invention include the provision of a hunting blind which incorporates structures, as described above, and which arranges those structures in manners described above for the achievement of functional benefits, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
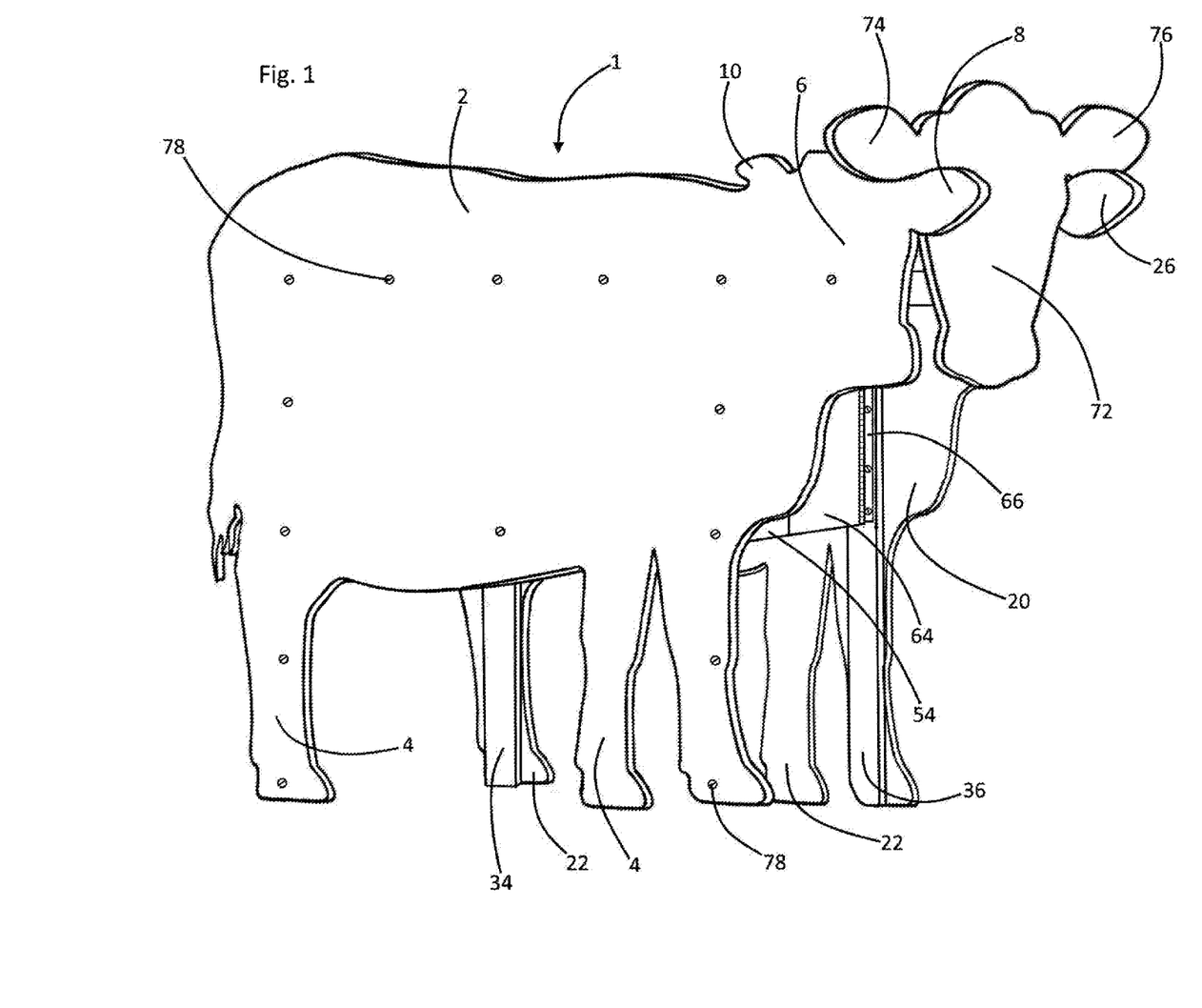
FIG. 1 is a perspective view of a preferred embodiment of the instant inventive hunting blind.

Referring now to the drawings and in particular to Drawing FIG. 1, a preferred embodiment of the instant inventive hunting blind is referred to generally by Reference Arrow 1. The hunting blind 1 comprises a right panel 2 which is preferably configured to silhouette a common cow. Such silhouetting configuration preferably includes leg portions 4 and a forward head portion 6. Ears 8 and 10 are preferably included within the cow silhouetting configuration, with an ear 8 preferably extending forwardly.

Figure 2:
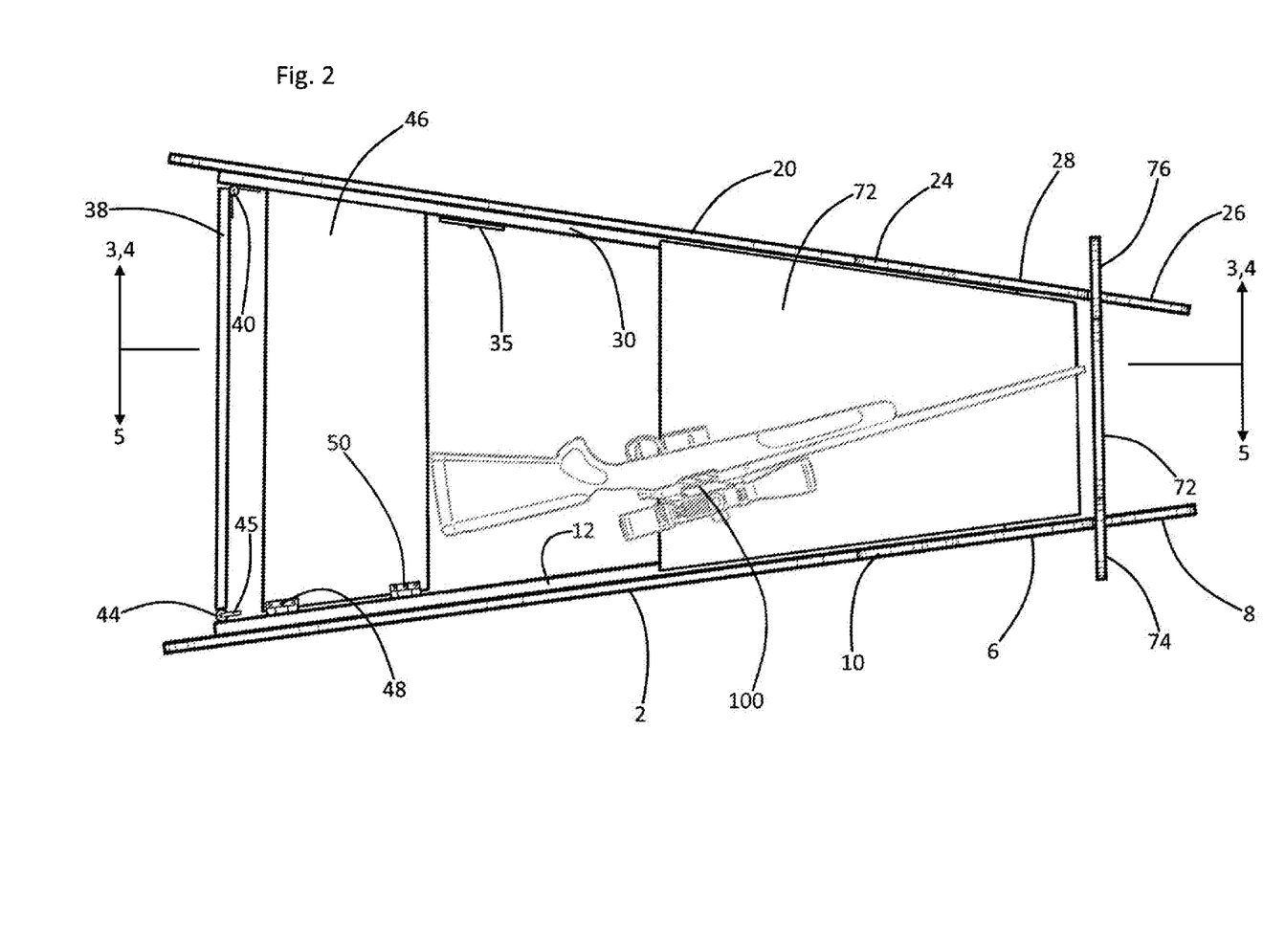
FIG. 2 is an upper view of the structure of FIG. 1.
Figure 3:
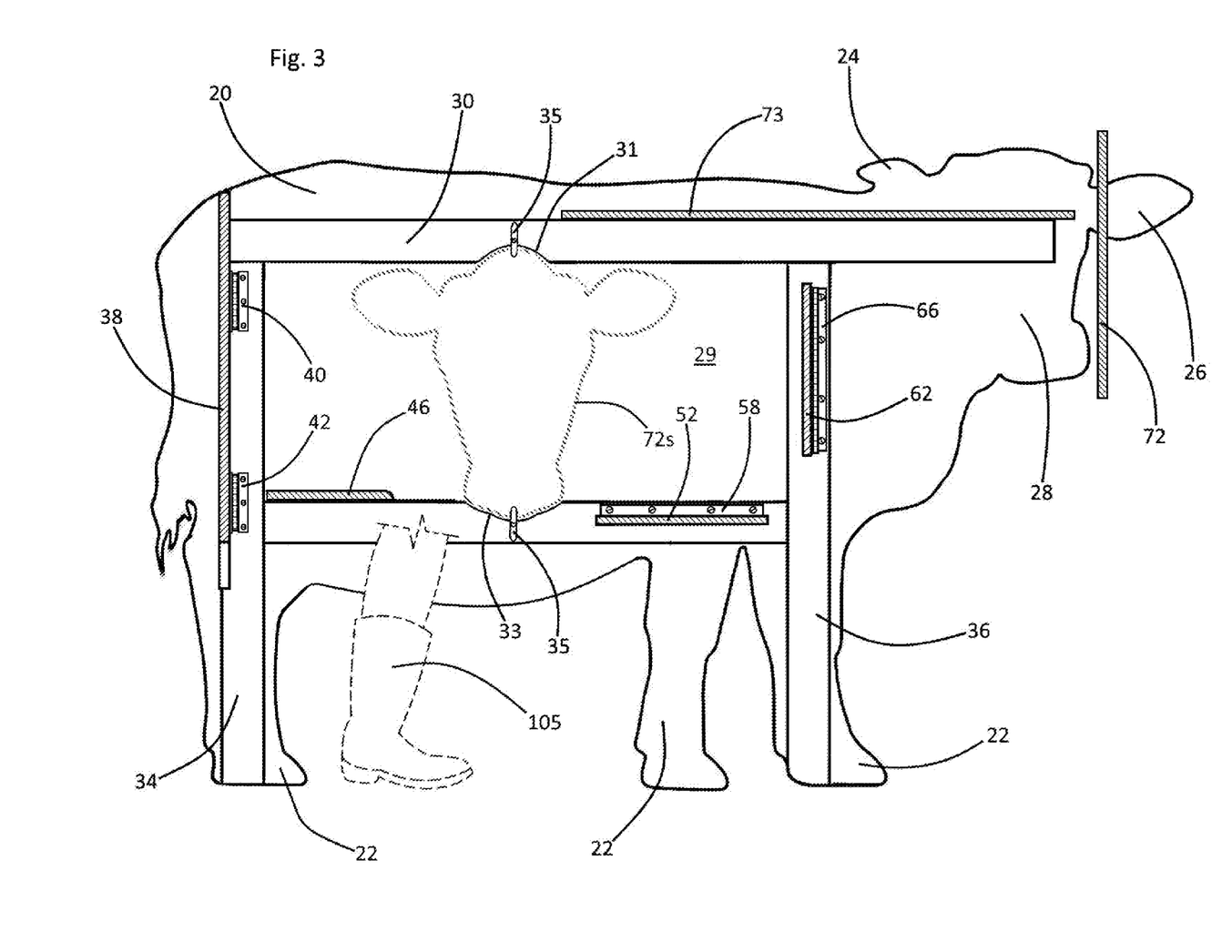
FIG. 3 is a sectional view as indicated in FIG. 2.

Referring simultaneously to FIGS. 1, 2, and 3, a left panel 20 is preferably mirroringly configured with respect to the right panel 2, such left panel having legs 22, a cow head 28, and ears 24 and 26. Panels 2 and 20 may suitably comprise corrugated sheet material or, alternatively, plywood.

Figure 5:
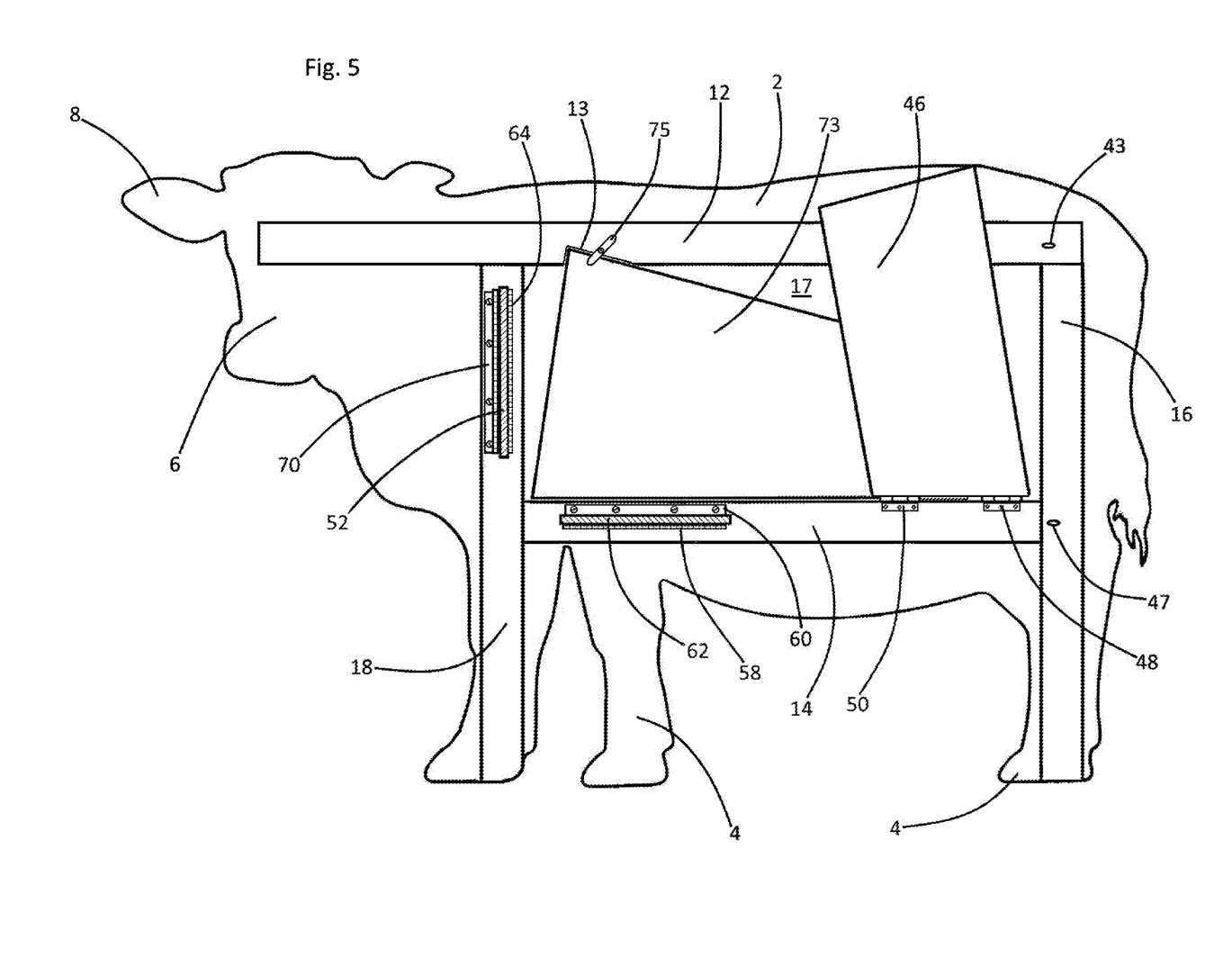
FIG. 5 is an alternative sectional view, as indicated in FIG. 2.

Referring simultaneously to FIGS. 1, 3, and 5, interior frames of stiffening braces are preferably attached via screws 78 to the interior surfaces of panels 2 and 20. Braces 12 and 18, and 30 and 32 extend longitudinally at the upper and lower ends of the panels 2 and 20, while vertical frame members 16 and 18, and 34 and 36 provide additional vertical support and rigidity.

A matrix of cross members 38, 46, 52, 54, 62, and 68 spans between panels 2 and 20. Such cross members preferably provide support to and hold the panels 2 and 20 in their vertically oriented positions with respect to the ground, while defining a hunter screening or shrouding space between the two panels.

In a preferred embodiment of the instant inventive hunting blind, one of the cross members among the matrix of cross members comprises a seat 46 which is suitably pivotally mounted to the right panel 2 at such panel's lower horizontal brace 14. The proximal or pivoting end of the seat cross member 46 is preferably pivotally attached, for example, by hinges 48 and 50, and the distal or orbiting end of the seat 46 suitably utilizes the upper surface or face of one of the lower horizontal braces 32 and 14 as a seat supporting pivot stop. Suitably, the seat 46 may be alternatively hingedly attached at the hunting blind's left and right side, or further alternatively, the seat 46 may be pivotally mounted to the hunting blind's rear door 38.

Figure 4:
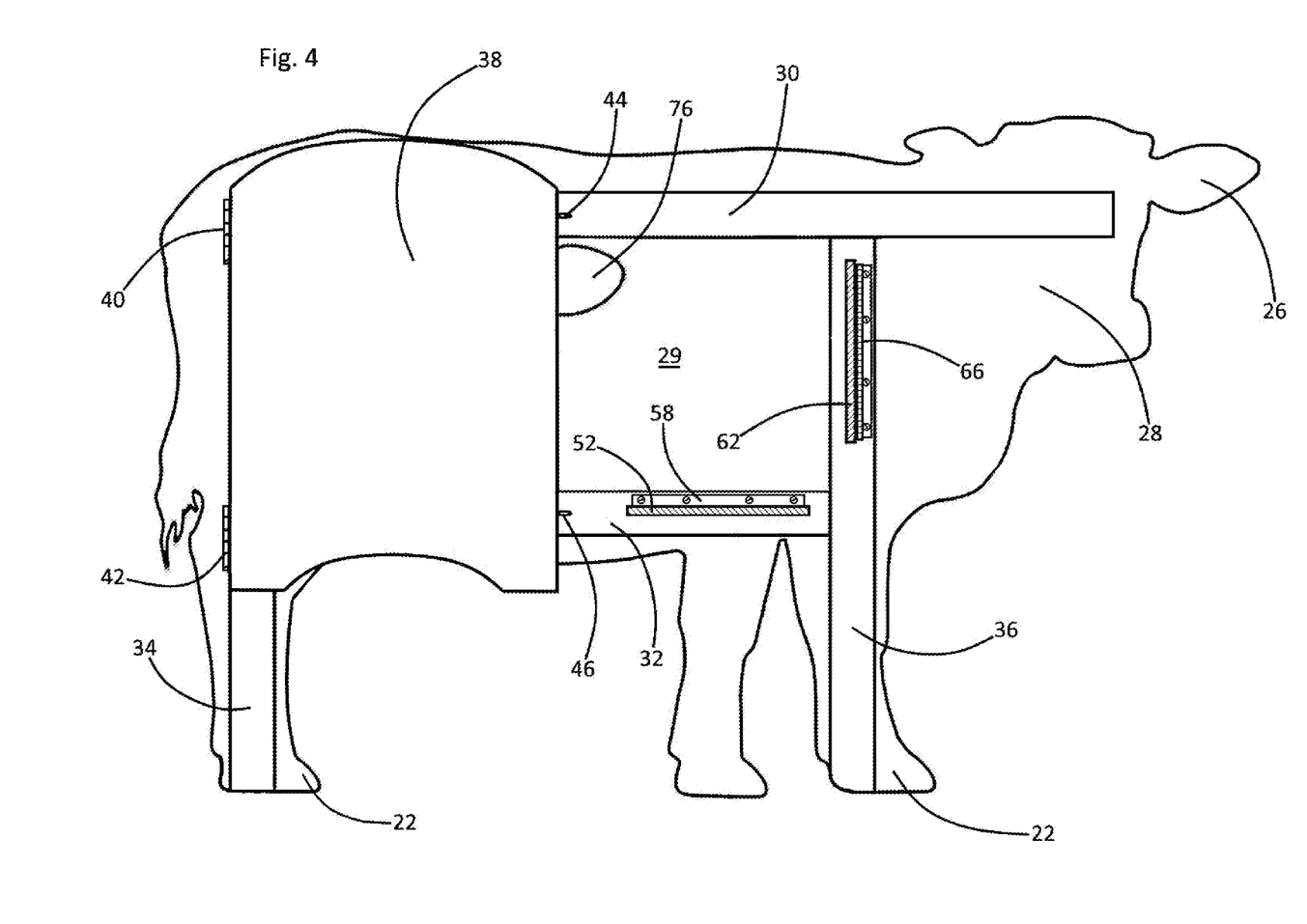
FIG. 4 redepicts the structure of FIG. 3, the view of FIG. 4 showing components differently configured.

The rear door 38 constitutes a further preferred member of the matrix of cross members, such cross member door preferably being hingedly attached to one of the rear vertical braces, brace 34 for example, by hinges 40 and 42. Pin and eye latches 43, 44, 45, 46, and 47 are preferably provided for releasably securing the distal or swinging end of the door 38 at the hunting blind's opposite side. As indicated in FIG. 4, the rear door cross member 38 is preferably configured in a manner which silhouettes the rear of a cow.

Referring to FIGS. 3 and 5, it is preferred that the legs 4 and 22 of the right and left cow silhouetting panels 2 and 20 present only a single hind leg in lateral profile. Such preference includes a rearward positioning of the seat 46, such positioning requiring that a hunter seat himself or herself at the rear of the blind. Such seating positioning advantageously positions such hunter's lower legs 105 (shown in dashed lines upon FIG. 3) at the approximate location of the silhouetted cow's hind legs. Accordingly, the instant invention, via its preferred rearward seating of the hunter, advantageously utilizes the hunter's lower legs as a visual component of the silhouetted cow. Game animals viewing the blind from the side visually perceive a normal array of cow legs, such array including the hunter's legs.

Figure 6:
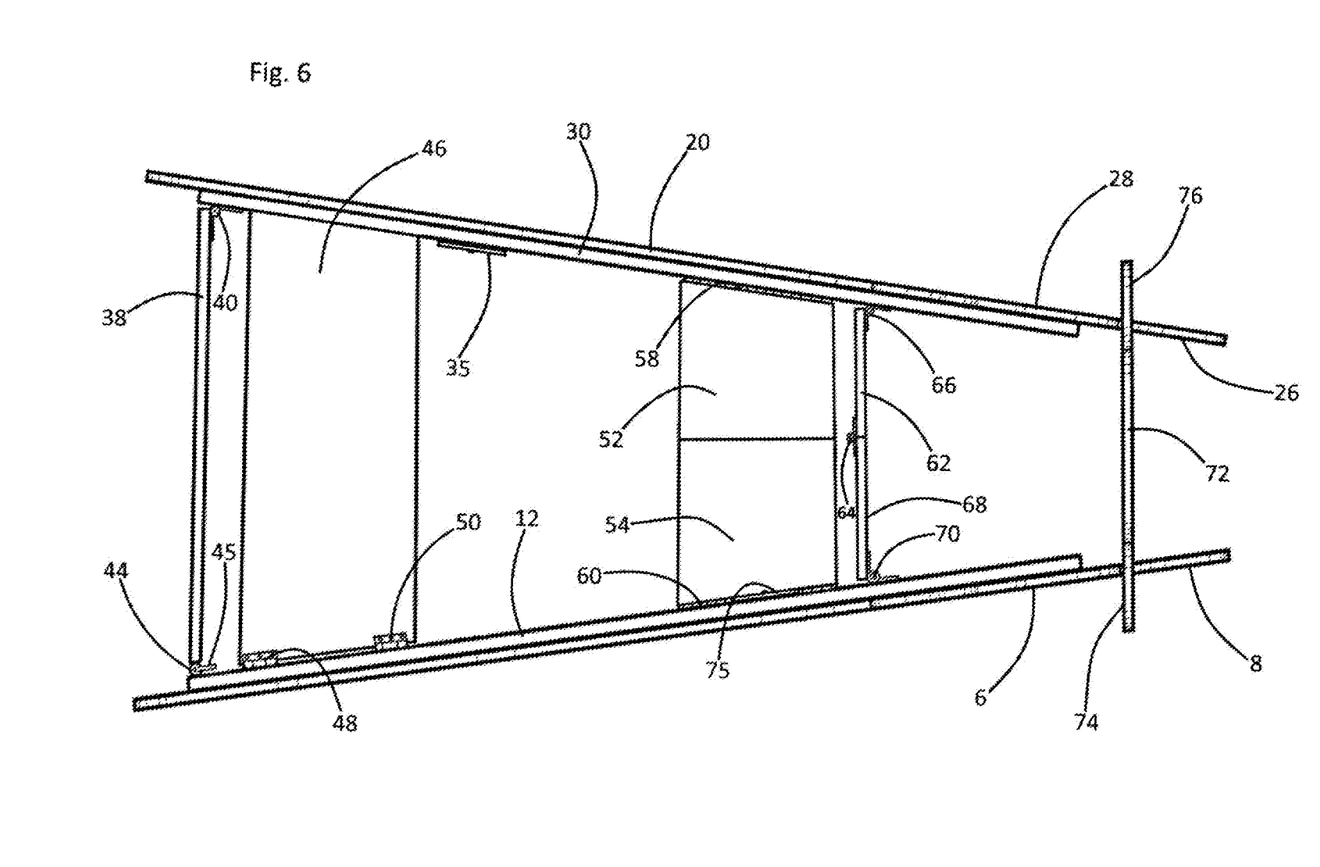
FIG. 6 redepicts the structure of FIG. 2, the view of FIG. 6 showing a cover panel removed.
Figure 7:
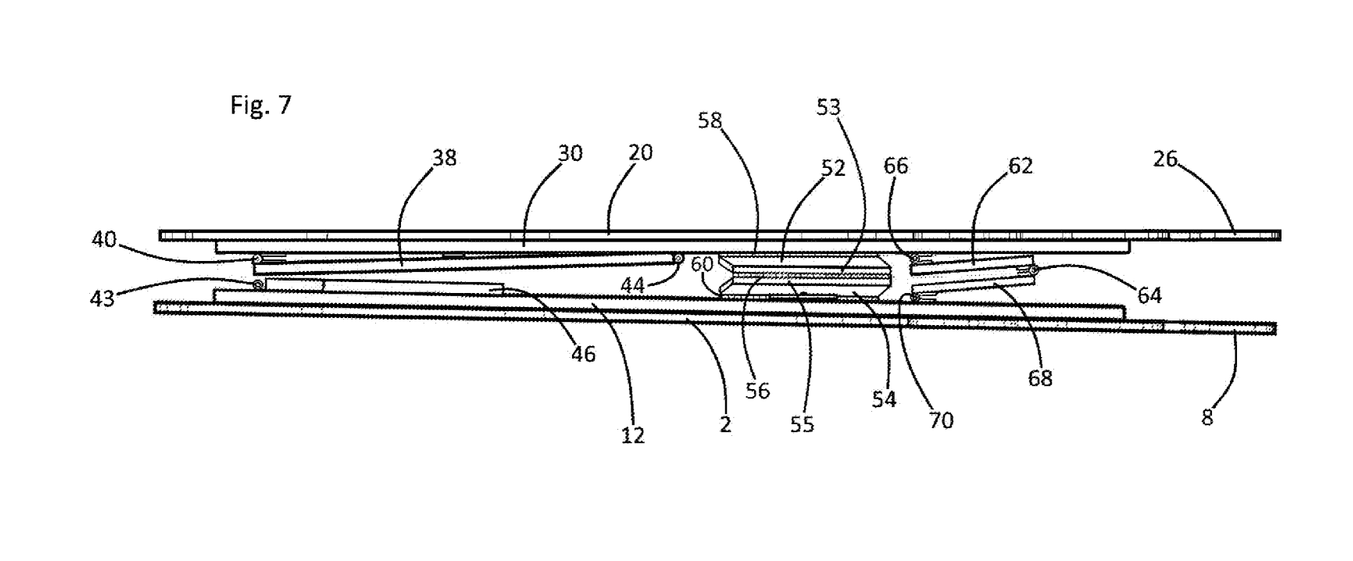
FIG. 7 shows the inventive hunting blind in a collapsed configuration.

Further cross members among the matrix of cross members comprise at least a first, and preferably first and second, folding leaf braces 52,54, and 62,68. In a preferred embodiment, folding leaf brace 52,54 is pivotally attached via horizontally oriented hinges 56, 58, and 60, so that such brace may pivot between a compact retracted and collapsed position, as indicated in FIG. 7, and an extended use position as depicted in FIG. 6. In the FIG. 6 position, brace 52,54 dually functions for left and right panel support, and as a storage shelf. In the storage shelf functioning position of FIG. 6, inner ends 53 and 55 of pivoting plates 52 and 54 abut in order to hold the brace in the depicted flat shelf configuration. Items such as rifle cartridges, gloves, and a canteen (not depicted in views) may be conveniently stored upon the upper surface of brace 52,54 during hunting use of the hunting blind.

A second folding leaf brace 62,68 preferably is vertically oriented in order to provide vertical support to the panels 20 and 2 in relation to the horizontal brace 52,54, such brace 62,68 having vertically oriented hinges 64, 66, and 70.

Referring to FIG. 1, in order to cause front views of the hunting blind 1 to better approximate the appearance of a cow, a cow head silhouetting plate 72 is preferably provided, such plate having left and right ears 74 and 76. Provided that the head portions 6 and 28 of the right and left panels 2 and 20 include forwardly extending ears 8 and 26, the right and left ears 74 and 76 of the head silhouetting plate 72 may conveniently rest upon and hook against ears 8 and 26, advantageously suspending and displaying plate 72 at the front of the hunting blind. Referring simultaneously to FIGS. 1 and 3, a recessed space 29 is formed and bounded by braces 30, 32, 34, and 36, such recess preferably utilized for storage of the cow head silhouetting plate 72. Such plate storage is preferably utilized while the hunting blind is maintained in its collapsed storage configuration, as indicated in FIG. 7. For purposes of fit and secure retention of the cow head plate 72 (alternatively indicated in dashed lines within space 29 as 72s), recesses 31 and 33 may be cut within horizontal braces 30 and 32, and rotatable latches 35 may be provided for holding plate 72s in place.

An upper cover plate 73 is preferably provided, such plate resting upon and being supported by the upper surfaces of horizontal braces 12 and 30. During hunting blind use, the cover plate 73 may be conveniently utilized for holding and supporting a hunting weapon, for example, a deer rifle 100. As indicated in FIGS. 3 and 5, the upper surfaces of braces 30 and 12 are situated downwardly from the upper edges of plates 20 and 2 a distance sufficient to allow plates 2 and 20 to laterally shroud screen views of such hunting weapon while it rests upon cover plate 73. During periods of storage, as indicated by FIGS. 5 and 7, the cover plate 73 may be stored in a nesting manner within recessed space 17. A fitted cut out 13 within horizontal brace 12 may be provided along rotary latch 75 for securely holding the plate 73 in place.

While the hunting blind 1 is configured as indicated in FIG. 7, the hunting blind may be conveniently stored and transported upon the load bed of a pickup truck. During hunting use, the blind may be carried to a desired location within a field, and may be placed upright. Thereafter, the blind may be laterally expanded from the collapsed FIG. 7 configuration to the expanded FIG. 6 use configuration. Thereafter, a hunter may conveniently enter the interior of the hunting blind by opening and inwardly swinging the rear door 38. Thereafter, the door 38 may be re-closed and re-latched, and seat 46 may be pivoted downwardly. Thereafter, the hunter may release the cow head plate 72 from latches 35, and may forwardly suspend such plate to suspend from ears 74 and 76 as indicated in FIG. 1. The hunter may additionally unlatch and remove panel 73 and may place such panel upon braces 30 and 12 to laterally span the interior of the hunting blind at its upper end as indicated in FIG. 2.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A hunting blind comprising:
   (a) a right panel having a head end, a rear end, and a cow silhouetting periphery;
   (b) a left panel having a head end, a rear end, and a cow silhouetting periphery; and
   (c) a matrix of cross members spanning between the right and left panels,
   wherein at least one member among the matrix of cross members comprises a seat,
   wherein another member among the matrix of cross members comprises a rear door.

2. The hunting blind of claim 1 wherein the seat is pivotally mounted to the right panel or is pivotally mounted to the left panel.

3. The hunting blind of claim 1 wherein said another member is pivotally mounted to the left panel or is pivotally mounted to the right panel.

4. The hunting blind of claim 3 wherein said another member has a cow rear silhouetting periphery.

5. The hunting blind of claim 1 wherein a second other member among the matrix of cross members comprises at least a first folding leaf brace.

6. The hunting blind of claim 5 wherein the at least first folding leaf brace is adapted for pivoting between a retracted position and a storage shelf position.

7. The hunting blind of claim 6 wherein a third other member among the matrix of cross members comprises a second folding leaf brace.

8. The hunting blind of claim 7 wherein the second folding leaf brace is adapted for pivoting about substantially vertical axes.

9. The hunting blind of claim 1 and further comprising a cow head silhouetting plate, said plate being removably suspended at the head ends of the left and right panels.

10. The hunting blind of claim 1 wherein each cow silhouetting periphery includes only one hind leg, and wherein the seat is positioned rearwardly.

* * * * *